United States Patent
Yao et al.

(10) Patent No.: US 11,110,544 B2
(45) Date of Patent: Sep. 7, 2021

(54) FLEXIBLE SELF-ADAPTIVE COMPOSITE CARBON BRUSH-TYPE ELECTROMAGNETIC COMPOSITE FIELD SYNCHRONOUS LASER CLADDING DEVICE

(71) Applicant: ZHEJIANG UNIVERSITY OF TECHNOLOGY, Zhejiang (CN)

(72) Inventors: Jianhua Yao, Zhejiang (CN); Liang Wang, Zhejiang (CN); Qunli Zhang, Zhejiang (CN); Guolong Wu, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 212 days.

(21) Appl. No.: 16/486,116

(22) PCT Filed: Apr. 28, 2018

(86) PCT No.: PCT/CN2018/084974
§ 371 (c)(1),
(2) Date: Aug. 14, 2019

(87) PCT Pub. No.: WO2019/104942
PCT Pub. Date: Jun. 6, 2019

(65) Prior Publication Data
US 2020/0030911 A1 Jan. 30, 2020

(30) Foreign Application Priority Data
Dec. 1, 2017 (CN) .......................... 201711246103.6

(51) Int. Cl.
*B23K 26/08* (2014.01)
*C23C 24/10* (2006.01)

(52) U.S. Cl.
CPC .......... *B23K 26/0876* (2013.01); *C23C 24/10* (2013.01)

(58) Field of Classification Search
CPC ...... B23K 26/00; B23K 26/042; B23K 26/70; B23K 26/0876
(Continued)

(56) References Cited

U.S. PATENT DOCUMENTS 3,452,178 A * 6/1969 Werner ................. G08B 25/045
219/121.6
4,940,879 A * 7/1990 De-Swaan ............. B23K 10/00
219/121.39
(Continued)

FOREIGN PATENT DOCUMENTS

CN 102385968 A 3/2012
CN 103273201 A * 9/2013
(Continued)

*Primary Examiner* — Ibrahime A Abraham
*Assistant Examiner* — Chris Q Liu
(74) *Attorney, Agent, or Firm* — Muncy, Geissler, Olds & Lowe, P.C.

(57) ABSTRACT

A flexible self-adaptive composite carbon brush-type electromagnetic composite field synchronous laser cladding device, comprising an electromagnetic field synchronous coupling module that processes a part to be processed, a mechanical arm that drives the electromagnetic field synchronous coupling module to move, and a laser that generates laser; the electromagnetic field synchronous coupling module comprises a laser head, an electric field portion and a magnetic field portion; the magnetic field portion comprises two magnetic field generating modules, and the electric field portion comprises two electric field generating modules, the magnetic field portion and the electric field portion both being fixedly erected at the periphery of the laser head by means of a supporting structure. This invention adopts four sets of coil parts arranged in the annular cir-
(Continued)

cumference, and continuous adjustment of the magnetic field size can be realized with the external magnetic field power supply, and the size meets the use requirement; the design of the pointed part of the iron core head improves the magnetic field intensity and linearity of the processing surface. The supporting structure ensures simultaneous follow-up coupling of the electric and magnetic fields.

11 Claims, 9 Drawing Sheets

(58) Field of Classification Search
USPC ............ 219/121.78, 121.6, 121.63, 121.84, 219/121.66, 121.67, 121.72
See application file for complete search history.

(56) References Cited

U.S. PATENT DOCUMENTS

| | | | | |
|---|---|---|---|---|
| 5,015,818 | A | * | 5/1991 | Kautz .................... B23K 26/16 219/121.63 |
| 6,327,875 | B1 | * | 12/2001 | Allaire ................ B23K 26/073 219/121.67 |
| 2004/0011952 | A1 | * | 1/2004 | Johnston ............. H01J 49/0422 250/287 |
| 2005/0061779 | A1 | * | 3/2005 | Blumenfeld ........... B23K 26/03 219/121.6 |
| 2008/0308537 | A1 | * | 12/2008 | Klostermann .... H01L 21/67115 219/121.66 |
| 2016/0375492 | A1 | * | 12/2016 | Bencher .................. B22F 10/20 419/26 |
| 2017/0106477 | A1 | * | 4/2017 | Mironets .............. B23K 26/702 |
| 2017/0274475 | A1 | * | 9/2017 | Pan ...................... B23K 26/342 |

FOREIGN PATENT DOCUMENTS

| | | | | | |
|---|---|---|---|---|---|
| CN | | 103753028 | A | * | 4/2014 |
| CN | | 103774136 | A | | 5/2014 |
| CN | | 103774136 | B | * | 12/2015 |
| CN | | 106624365 | A | | 5/2017 |
| CN | | 106799539 | A | | 6/2017 |
| CN | | 107868958 | A | | 4/2018 |
| CN | | 107904597 | A | | 4/2018 |
| GB | | 2264887 | A | * | 9/1993 .......... B23K 26/382 |
| KR | 20160077795 | A | | | 7/2016 |

* cited by examiner

FLEXIBLE SELF-ADAPTIVE COMPOSITE CARBON BRUSH-TYPE ELECTROMAGNETIC COMPOSITE FIELD SYNCHRONOUS LASER CLADDING DEVICE

TECHNICAL FIELD

The present invention relates to a flexible self-adaptive composite carbon brush type electromagnetic composite field synchronous laser cladding device.

BACKGROUND ART

In the laser processing process, the control means of adding the electromagnetic composite field can effectively improve the regulation effect of the traditional control process and achieve the performance improvement by controlling the size and direction of the Lorentz force. Especially for large industrial parts, it is difficult to realize the synchronous coupling of the electro-magnetic composite field in the laser processing process, which limits the application of the technology in the actual production process.

Chinese Patent Application No. 2013052755461.5, filed by Yao Jianhua et al. of Zhejiang University of Technology, discloses a static magnetic field-laser coaxial composite cladding method and apparatus, which integrates a magnetic field generating device on a laser head to realize synchronous movement of a magnetic field. But it only achieves the synchronous coupling of the steady-state magnetic field, the improvement effect on the molten pool is limited, and the magnetic field intensity is limited, which cannot meet the actual processing needs.

Chinese Patent Application No. 201611014732.1, filed by Yao Jianhua et al. of Zhejiang University of Technology, discloses an electro-magnetic composite field cooperative laser cladding device whose magnetism is supplied by permanent magnets, including a laser cladding portion, a bracket portion, an electric field portion and a magnetic field portion. The magnetism of the magnetic field is supplied by the permanent magnet. The sample is clamped on the bracket. The angle and position can be adjusted to match the angle of the sample. However, it has strict requirements on the shape of the sample, and the mica insulation layer will fail due to high temperature. The adjustment of the magnetic field size is limited, and the conditions of application are limited.

SUMMARY OF THE INVENTION

In order to overcome the defects existing in the background art, the present invention provides a flexible self-adaptive composite carbon brush type electromagnetic composite field synchronous laser cladding device.

The technical solution of the present invention to solve the above problems is:

A flexible self-adaptive composite carbon brush type electromagnetic composite field synchronous laser cladding device, comprises an electromagnetic field synchronous coupling module that processes a part to be processed, a mechanical arm that drives the electromagnetic field synchronous coupling module to move, and a laser that generates laser;

The electromagnetic field synchronous coupling module comprises a laser head, an electric field portion and a magnetic field portion;

The laser head is connected with the mechanical arm through a fixing frame, wherein the fixing frame comprises an upper fixing plate and a lower fixing plate which are opposite to each other in an up-and-down manner, and the upper fixing plate and the lower fixing plate are horizontally laid; the input tube of the laser head penetrates through the upper fixing plate upwards and is connected with the laser, and the output tube of the laser head vertically penetrates through the lower fixing plate, and the lower end outlet of the output tube is located above the part to be processed;

The magnetic field portion comprises two magnetic field generating modules which are arranged on the front side and the rear side of the output tube in the radial direction of the output tube respectively, the magnetic field generating module comprises a U-shaped iron core with a downward opening, the two ends of the U-shaped iron core correspond to a set of coil parts respectively; and the coil part comprises an electromagnetic coil, a coil framework made of a non-magnetic material and a shell made of a non-magnetic material, and the shell is arranged outside the coil framework and the electromagnetic coil; the coil framework comprises a hollow central column and baffles arranged at the two ends of the central column in a sleeved mode, the electromagnetic coil is wound on the central column and is positioned between the two baffles on the central column; the two ends of the central column are communicated, and one end of the U-shaped iron core penetrates through the central column;

the ends, located on the same side, of the two U-shaped iron cores is connected with one iron core head, and the ends, located on the other side, of the two U-shaped iron cores is connected with the other iron core head, and the two iron core heads are symmetrically arranged relative to the axial direction of the output tube;

The iron core head comprises an iron core head body extending along the radial direction of the output tube, the central axis of the iron core head body is perpendicular to the central axis of the output tube; and a connecting block used for being detachably connected with the two U-shaped iron cores is arranged at the outer end of the iron core head body, and the inner end of the iron core head body is provided with a pointed part pointing to an extension line of the central axis of the output tube, and the iron core heads located on the two sides of the to-be-processed area of the part to be processed are located below the output tube;

The intersection point of the connecting line of the central axis of the two iron core heads and the extension line of the central axis of the output tube is defined as the origin of coordinates, and a straight line which passes through the origin of coordinates and coincides with the central axis of the output tube is a z axis, and the connecting line of the central axis of the two iron core heads is an x axis, and the y-axis passes through the origin of coordinates, and is perpendicular to both the z-axis and the x-axis direction; and the x-axis direction is defined as the front-and-back direction, and the y-axis direction is the left-and-right direction, and the z-axis direction is the vertical direction, and the end close to the output tube located in the middle is an inner end, the end far away from the output tube is an outer end, and the two sets of magnetic field generating modules are symmetric with respect to the x axis, the included angle between the two U-shaped iron cores is θ, 0<θ<180°;

The material and the number of turns of the electromagnetic coil of each coil part are the same, and the two ends of each electromagnetic coil are respectively provided with a connecting end used for being connected with a magnetic field power supply, the two ends of the electromagnetic coil are respectively connected with the magnetic field power supply, and the electromagnetic coils are connected in parallel; the magnetic field directions of the two electromagnetic coils located on the same U-shaped iron core are opposite, and the magnetic field intensity is the same; the magnetic field directions and all the magnetic field intensity of the two electromagnetic coils which are symmetric with respect to the x axis on the different U-shaped iron cores are the same;

A cooling part used for cooling the electromagnetic coils is arranged on the shell;

The electric field portion comprises two sets of electric field generating modules which are oppositely arranged on the left side and the right side of the output tube in the y-axis direction, and the two sets of electric field generating modules are symmetric with respect to the z axis; the electric field generating module comprises a carbon brush set and a scissor fork lifting platform capable of driving the carbon brush set to move in the y-axis direction and the z-axis direction; the scissor fork lifting platform is provided with a clamp used for fixing the carbon brush set, and the carbon brush set is connected with a connecting head used for connecting with an electric field power supply;

The scissor fork lifting platform comprises a top plate and a bottom plate, wherein the top plate and the bottom plate are arranged at intervals up and down, and both the top plate and the bottom plate are perpendicular to the z axis; a first side plate is oppositely arranged on the front side and the rear side of the upper surface of the bottom plate, and a first sliding groove which extends in the y-axis direction is formed in the inner end of the first side plate, and the two ends of the first sliding rod are arranged in the first sliding grooves in the two sides in a sliding mode, and the first sliding rod extends in the x-axis direction; the two ends of the first rotating shaft are rotatably arranged on the outer ends of the two first side plates respectively, and the first rotating shaft extends in the x-axis direction; and second side plates are oppositely arranged on the front side and the rear side of the lower surface of the top plate, and a second sliding groove which extends in the y-axis direction is formed in the outer end of the second side plate, and the two ends of the second sliding rod are arranged in the second sliding grooves in the two sides in a sliding mode; and the two ends of the second rotating shaft are rotationally arranged at the inner ends of the two second side plates respectively, and the second rotating shaft extends in the x-axis direction;

A third rotating shaft and a fourth rotating shaft which extend in the x-axis direction are also arranged between the top plate and the bottom plate, and the third rotating shaft and the fourth rotating shaft are located on the same xoy plane; the third rotating shaft and the fourth rotating shaft are connected through an adjusting screw rod, and the inner end of the adjusting screw rod penetrates through the third rotating shaft and the fourth rotating shaft in the y-axis direction, the adjusting screw rod is engaged by thread with the third rotating shaft and the fourth rotating shaft, and an adjusting head is arranged at the outer end of the adjusting screw rod;

The scissor fork lifting platform further comprises two scissor fork arms which are connected up and down, wherein the scissor fork arm comprises two connecting rods which are hinged in the middle, and the two ends of the two connecting rods respectively form a connecting end of the scissor fork arm; the two ends of the first rotating shaft, the first sliding rod, the third rotating shaft and the fourth rotating shaft are respectively hinged with the connecting end of the scissor fork arm; the two ends of the second rotating shaft, the second sliding rod, the third rotating shaft and the fourth rotating shaft are respectively hinged with the connecting end of the other scissor fork arm A groove is formed in the lower surface of the clamp, a spring capable of stretching out of in the z-axis direction is arranged in the groove, and the upper end of the spring is fixed in the groove, the carbon brush set comprises a plurality of carbon brushes, and the upper end of the carbon brushes extends into the groove and is connected with the lower end of the spring, the lower surface of the carbon brush is located below the output tube;

The magnetic field portion and the electric field portion are fixedly erected at the periphery of the laser head through the supporting structure; wherein the supporting structure comprises a L-shaped main supporting frame, wherein the main supporting frame comprises a vertical plate and a horizontal plate, and the lower end of the vertical plate is fixedly connected with the inner end of the horizontal plate, the upper end of the vertical plate is fixed on the side surface of the lower fixing plate;

The supporting structure further comprises a coil supporting frame for fixing the coil part, a coil supporting frame comprises four supporting plates for supporting the coil part, and a first through hole allowing one end of the U-shaped iron core to penetrate through is formed in the middle of each supporting plate, and one end of the U-shaped iron core penetrates through the first through hole and is connected with the iron core head, and the inner side of the supporting plate is fixed on the horizontal plate through a connecting plate; and the shell is fixedly connected with the supporting plate and the connecting plate;

The top plate of the electric field portion is fixed on the lower surface of the horizontal plate through bolts and nuts.

Further, the shell is in a rectangular frame shape, and a second through hole and a third through hole for allowing one end of the U-shaped iron core to penetrate through are formed in the top surface and the bottom surface of the rectangular frame; the cooling part comprises an inner air flow channel arranged on the side surface of the rectangular frame, and the inner air flow channel extends from the top surface of the rectangular frame to the bottom surface in the central axis direction of the electromagnetic coil; an air inlet of the inner air flow channel is formed in the top surface of the rectangular frame, and the air inlet is communicated with the high-pressure air source; a plurality of air outlets which are arranged in a row are formed in one side, facing the electromagnetic coil, of the inner air flow channel;

Further, the magnetic field directions of the two electromagnetic coils located on the same U-shaped iron core are opposite, and the magnetic field intensity of that is the same; the magnetic field directions and the magnetic field intensity of the two electromagnetic coils on the different U-shaped iron cores which are symmetric with respect to the x axis are the same, and the specific implementation structure is as follows: each electromagnetic coil is provided with an upper wiring end and a lower wiring end, and the upper wiring end of each electromagnetic coil is connected with the positive electrode of the magnetic field power supply, and the lower wiring end of each electromagnetic coil is connected with the negative electrode of the magnetic field power supply; and the winding directions of the two electromagnetic coils located on the same U-shaped iron core are opposite on the central column, the winding directions of the two electromagnetic coils which are symmetric with respect to the x axis on the different U-shaped iron cores are the same on the central column;

Or, the magnetic field directions of the two electromagnetic coils located on the same U-shaped iron core are opposite, and the magnetic field intensity of that is the same, the magnetic field directions and the magnetic field intensity of the two electromagnetic coils which are symmetric with respect to the x axis on the different U-shaped iron cores are the same, and the specific implementation structure is as follows: each electromagnetic coil is provided with an upper wiring end and a lower wiring end, and the upper wiring ends of the two electromagnetic coils located on the same U-shaped iron core are connected with different electrodes of the magnetic field power supply respectively, and the lower wiring ends of the two electromagnetic coils located on the same U-shaped iron core are connected with different electrodes of the magnetic field power supply respectively; and the upper wiring ends of the two electromagnetic coils which are symmetric with respect to the x axis on different U-shaped iron cores are respectively connected with the same electrode of the magnetic field power supply, the lower wiring ends of the two electromagnetic coils on different U-shaped iron cores which are symmetric with respect to the x axis are respectively connected with the same electrode of the magnetic field power supply;

Further, comprises a magnetic field junction box which is fixed on the side supporting frame, the side supporting frame is a trapezoid plate, and the left side and the right side of the side supporting frame are respectively fixed on the connecting plates on the two sides, and the inner surface of the side supporting frame is fixed on a vertical plate of the main supporting frame through a side connecting plate; and two wiring ports which are respectively connected with two electrodes of the magnetic field power supply are arranged on the magnetic field junction box, wherein the electromagnetic coil is respectively connected with two electrodes of the magnetic field power supply through the wiring ports;

Further, the carbon brush set comprises two carbon brushes which are both cuboid-shaped, and the two carbon brushes are symmetrically arranged in the y-axis direction; the lower surface of the carbon brush is a circular bead.

Further, the U-shaped iron core is in mortise and tenon connection with the iron core head, and a mortise is formed in the connecting block, a tenon which is matched with the mortise is arranged at the end of the U-shaped iron core;

Further, the connecting head is a wiring copper plate pad, and the wiring copper plate pad is arranged at one end of the clamp, the inner end of the wiring copper plate pad is connected with the carbon brush set, and the outer end of the wiring copper plate pad is exposed to the outer end of the clamp.

Further, the magnetic field power supply and the electric field power supply are both direct-current power sources.

Further, the pointed part is in a rectangular pyramid shape, and the big end of the rectangular pyramid is connected with the iron core head body, the small head end of the rectangular pyramid points to the output tube; and the lower surface of the pointed part is flush with the lower surface of the iron core head body.

The advantages of the present invention are:

1, Four sets of coil parts with annular circumference are adopted, the size of the magnetic field is continuously adjustable by being matched with an external magnetic field power supply, which meets the use requirement.

2, The shell is provided with a cooling part for cooling the electromagnetic coils, high-pressure air is introduced into the inner air flow channel for air cooling so as to reduce the temperature rise of the electromagnetic coils.

3, The design of the pointed part of the iron core head changes the magnetic field distribution, so that the intensity of the magnetic field is normal distribution along the z axis, compared with the magnetic field generated by the iron core head with no pointed part design(as shown in FIG. 11.), the magnetic field moves down overall along the z axis (as shown in FIG. 12.) so that the intensity and the linearity of the magnetic field of the processing surface are improved.

4, The carbon brush is connected with the carbon brush through a spring, and the spring can regulate the self-adaptive contact between the carbon brush and the machining surface.

5, The magnetic field portion and the electric field portion are fixedly arranged at the periphery of the laser head through the supporting structure, wherein the L-shaped coil supporting frame is connected with the inverted-V-shaped supporting plate, so that during actual use, to ensure a synchronous follow-up coupling of electric field, magnetic field and laser heads, and a stable electric-magnetic composite field is formed in the processing area so as to meet the requirements for repairing at the work site.

EMBODIMENTS

Embodiment 1

Figure 1:
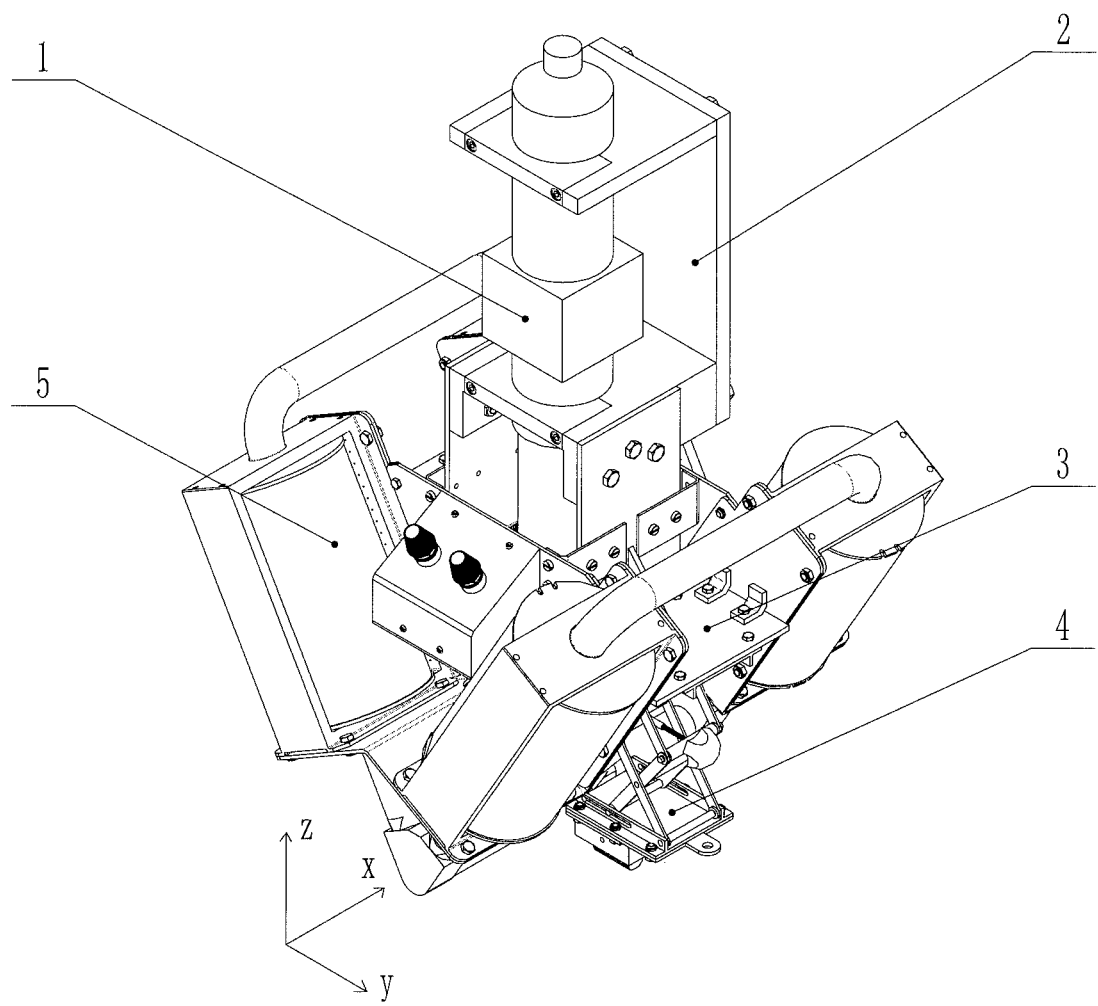
FIG. 1 is an isometric view of an electromagnetic field synchronous coupling module.
Figure 2:
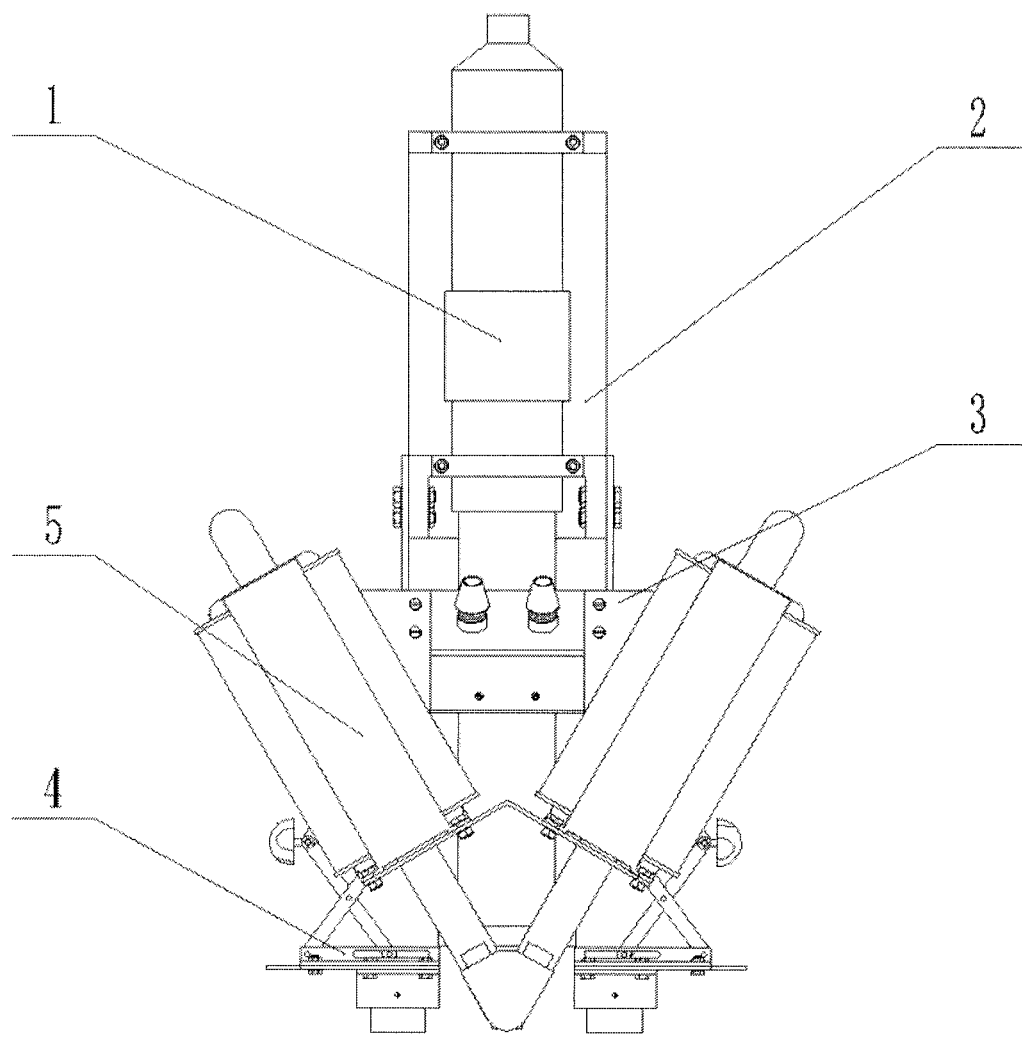
FIG. 2 is a front view of an electromagnetic field synchronous coupling module.
Figure 3:
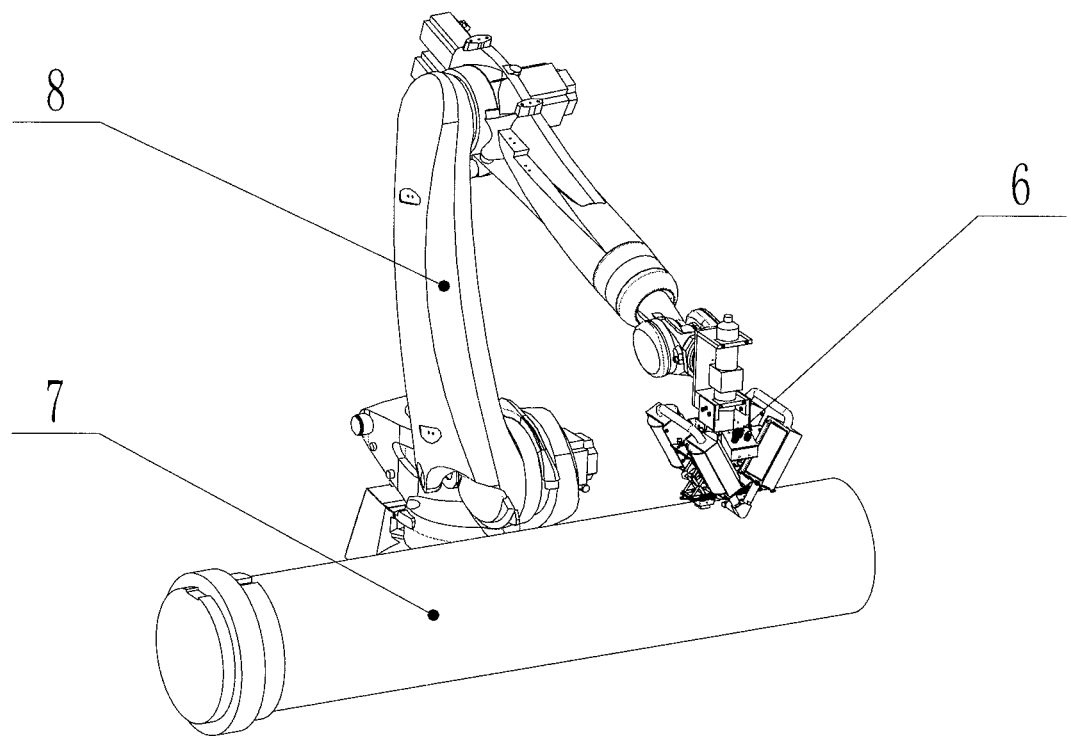
FIG. 3 is a schematic view of the field use of a laser cladding device constructed by the present invention.
Figure 4:
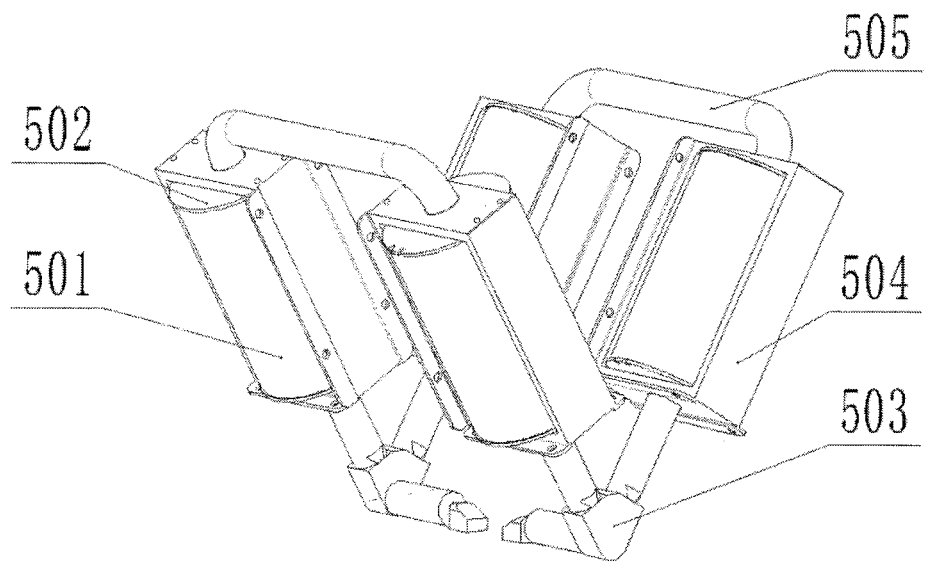
FIG. 4 is a schematic view of the structure of the magnetic field portion.
Figure 5:
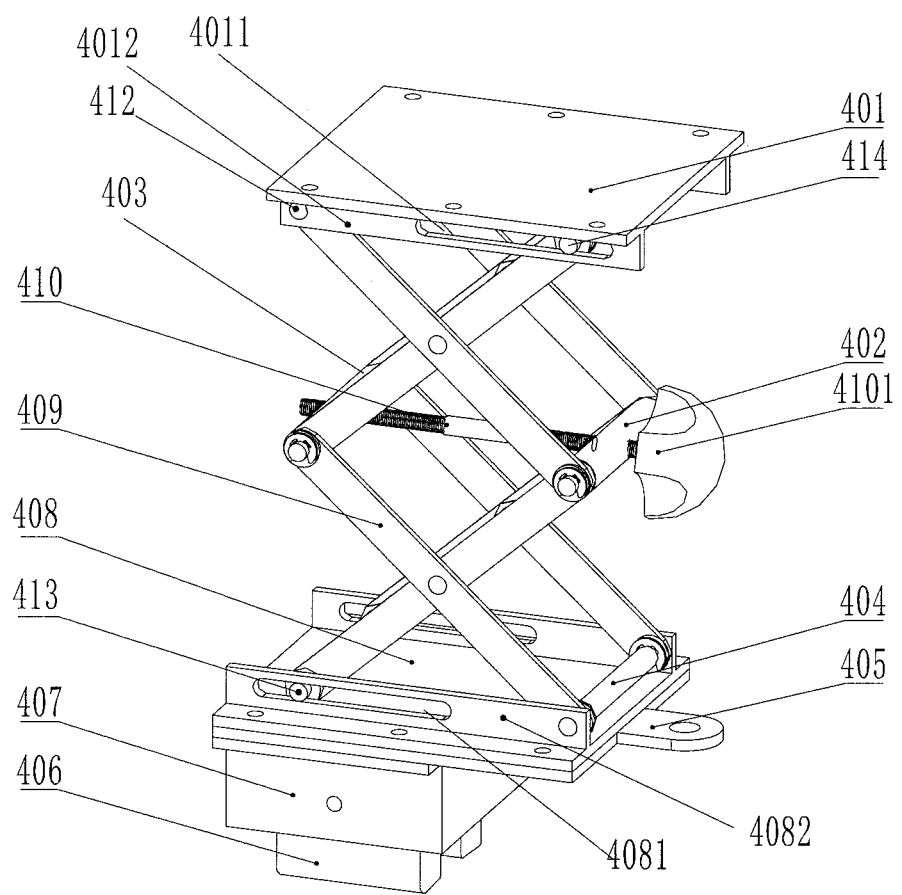
FIG. 5 is a schematic view of the structure of the electric field generating module.
Figure 6:
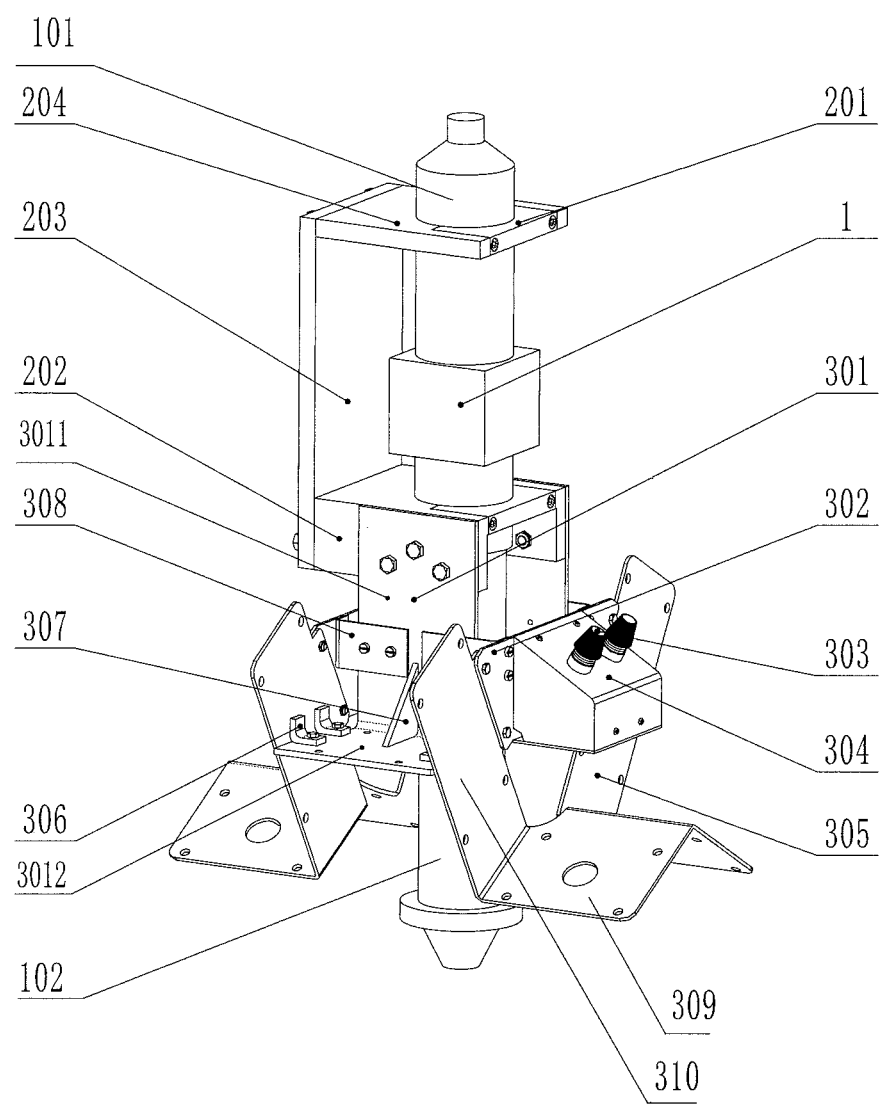
FIG. 6 is a schematic view of the assembly of the supporting structure.
Figure 7:
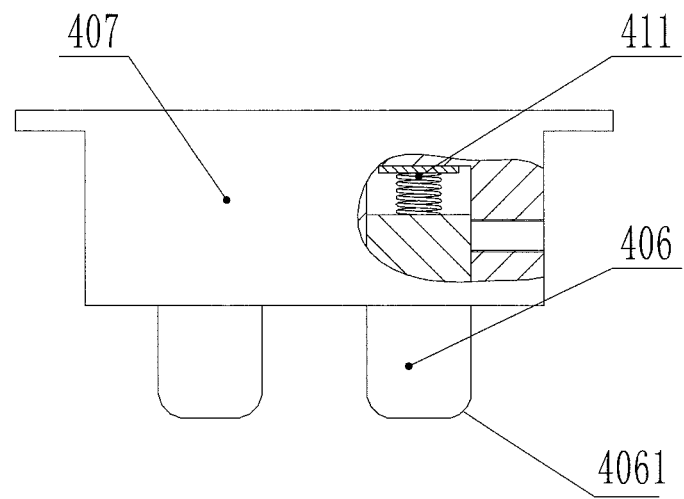
FIG. 7 is a schematic view of the assembly of the carbon brush set and the carbon brush set clamp.
Figure 8:
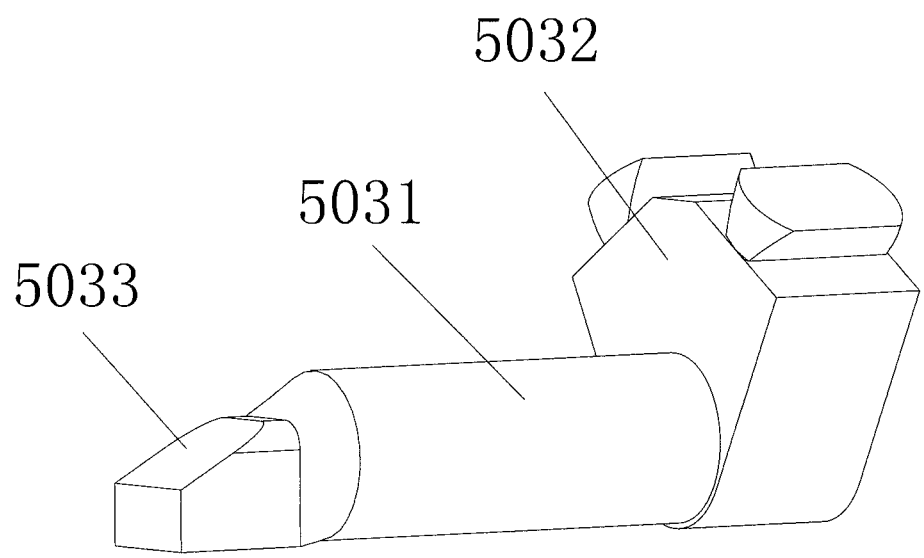
FIG. 8 is a schematic diagram of the enlarged structure of the iron core head.
Figure 9:
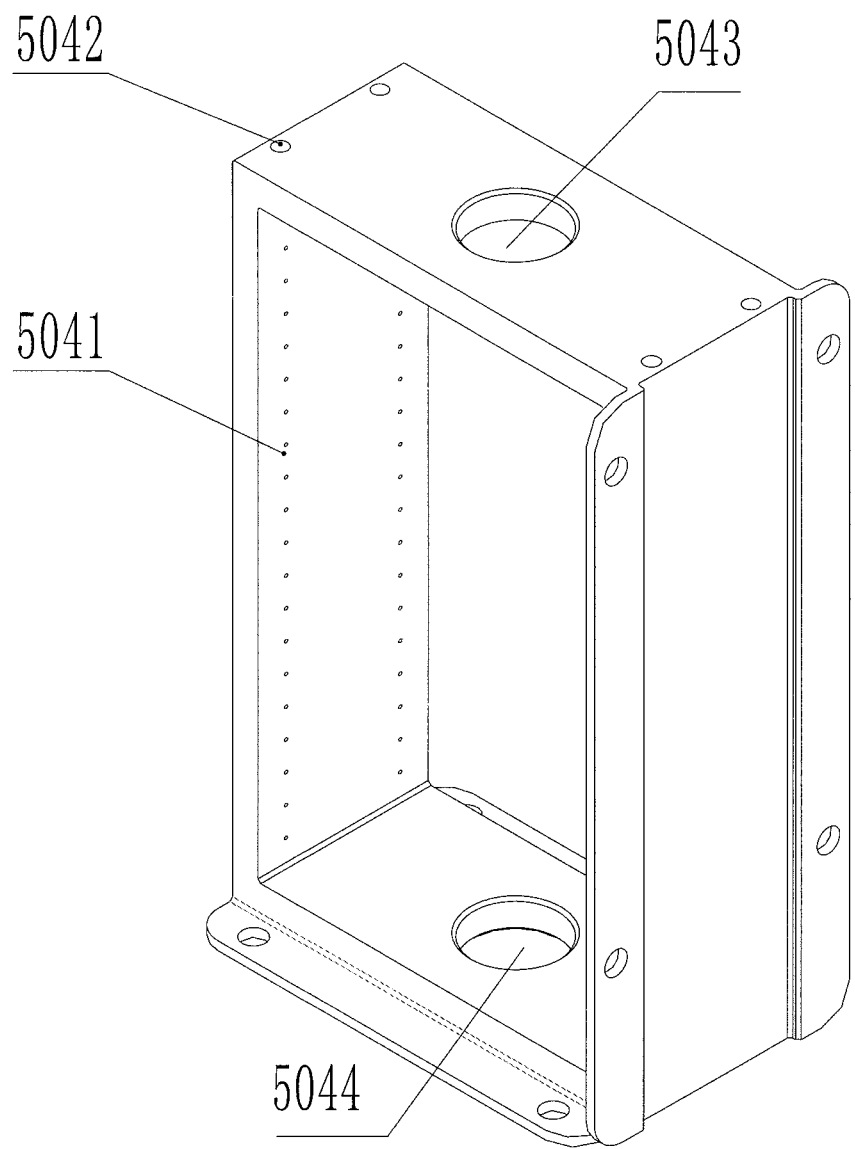
FIG. 9 is an isometric view of the shell.

Referring to FIG. 1-10, flexible self-adaptive composite carbon brush type electromagnetic composite field synchronous laser cladding device, comprises the electromagnetic field synchronous coupling module 6 that processing the part to be processed 7, a mechanical arm 8 for driving the electromagnetic field synchronous coupling module 6 to move and a laser generating laser; and further comprises a water cooler for ensuring the temperature of the cooling water of the laser head, a powder feeding device for feeding powder to the laser head and an air compressor providing compressed air for the cladding device.

The electromagnetic field synchronous coupling module 6 comprises a laser head 1, a laser head fixing frame 2, a supporting structure 3, an electric field portion and a magnetic field portion;

The laser head 1 is connected with the mechanical arm 8 through a laser head fixing frame 2, the laser head fixing frame 2 comprises an upper fixing plate 204 and a lower fixing plate 202 which are opposite to each other, and both the upper fixing plate 204 and the lower fixing plate 202 are horizontally laid; the input tube 101 of the laser head 1 penetrates through the upper fixing plate 204 upwards and is connected with the laser, the output tube 102 of the laser head 1 vertically penetrates through the lower fixing plate 202, and the lower end outlet of the output tube 102 is located above the part to be processed 7;

The magnetic field portion comprises two magnetic field generating modules 5 respectively arranged on the front side and the rear side of the output tube 102 along the radial direction of the output tube 102, the magnetic field generating module comprises a U-shaped iron core 505 with a downward opening, the two ends of the U-shaped iron core 505 correspond to a set of coil parts respectively; and the coil part comprises an electromagnetic coil 501, a coil framework 502 made of a non-magnetic material, and a shell 504 made of a non-magnetic material, the shell is arranged outside the coil framework 502 and the electromagnetic coil 501, and a heat dissipation window used for radiating the electromagnetic coil 501 is formed in the shell 504; the coil framework 502 comprises a hollow central column and baffles arranged at the two ends of the central column in a sleeved mode, the electromagnetic coil 501 is wound on the central column and located between the two baffles on the central column; the two ends of the central column are communicated, and one end of the U-shaped iron core 505 penetrates through the central column;

the ends, located on the same side, of the two U-shaped iron cores 505 is connected with an iron core head 503, and the ends, located on the other side, of the two U-shaped iron cores 505 is connected with the other iron core head 503, and the two iron core heads 503 are symmetrical with respect to the axial direction of the output tube 102, the material, the size, and the shape of the two iron core heads 503 are identical.

The iron core head 503 comprises an iron core head body 5031 extending along the radial direction of the output tube 102, the central axis of the iron core head body 5031 is perpendicular to the central axis of the output tube 102; a connecting block 5032 used for being detachably connected with the two U-shaped iron cores 505 is arranged at the outer end of the iron core head body 5031, the inner end of the iron core head body 5031 is provided with a pointed part 5033 pointing to an extension line of the central axis of the output tube 102, and the iron core heads 503 located on the two sides of the to-be-processed area of the part to be processed 7 are located below the output tube 102;

The intersection point of the connecting line of the central axis of the two iron core heads 503 and the extension line of the central axis of the output tube is defined as the origin of coordinates, and a straight line which passes through the origin of coordinates and coincides with the central axis of the output tube 102 is a z axis, and the connecting line of the central axis of the two iron core heads 503 is an x axis, and the y-axis passes through the origin of coordinates, and is perpendicular to both the z-axis and the x-axis direction; the x-axis direction is defined as the front-and-back direction, and the y-axis direction is the left-and-right direction, and the z-axis direction is the vertical direction, and the end close to the output tube and located in the middle, is an inner end, the end far away from the output tube is an outer end, and the two sets of magnetic field generating modules are symmetric with respect to the x axis, the included angle between the two U-shaped iron cores 505 is θ, 0<θ<180°;

The material and the number of turns of the electromagnetic coil 501 of the magnetic field generating modules 5 are the same, and the two ends of each electromagnetic coil 501 are respectively provided with a connecting end used for being connected with a magnetic field power supply, the two ends of the electromagnetic coil 501 are respectively connected with the magnetic field power supply, and the electromagnetic coils 501 are connected in parallel; the magnetic field directions of the two electromagnetic coils 501 located on the same U-shaped iron core 505 are opposite, and the magnetic field intensity is the same; both the magnetic field directions and the magnetic field intensity of the two electromagnetic coils 501 which are symmetric with respect to the x axis on the different U-shaped iron cores 505 are the same;

A cooling part for cooling the electromagnetic coils 501 is further arranged on the shell 504.

The electric field portion comprises two sets of electric field generating modules 4 which are oppositely arranged on the left side and the right side of the output tube 102 in the y-axis direction, and the two sets of electric field generating modules 4 are symmetric with respect to the z axis; the electric field generating module 4 comprises a carbon brush set 406 and a scissor fork lifting platform capable of driving the carbon brush set 406 to move in the y-axis direction and the z-axis direction; and a clamp 407 used for fixing the carbon brush set 406 is arranged on the scissor fork lifting platform, and the carbon brush set 406 is connected with a connecting head 405 used for being communicated with an electric field power supply;

The scissor fork lifting platform comprises a top plate 401 and a bottom plate 408, wherein the top plate 401 and the bottom plate 408 are arranged at intervals up and down, and both the top plate 401 and the bottom plate 408 are perpendicular to the z-axis; a first side plate 4082 is oppositely arranged on the front side and the rear side of the upper surface of the bottom plate 408, and a first sliding groove 4081 extending in the y-axis direction is formed in the inner end of the first side plate 4082, and the two ends of the first sliding rod 413 are arranged in the first sliding grooves 4081 in the two sides in a sliding mode, and the first sliding rod 413 extends in the x-axis direction; and the two ends of the first rotating shaft 404 are rotatably arranged on the outer ends of the two first side plates 4082 respectively, and the first rotating shaft 404 extends in the x-axis direction; and second side plates 4012 are oppositely arranged on the front side and the rear side of the lower surface of the top plate 401, and a second sliding groove 4011 extending in the y-axis direction is formed in the outer end of the second side plate 4012, the two ends of the second sliding rod 414 are arranged in the second sliding grooves 4011 in a sliding mode on the two sides; and the two ends of the second rotating shaft 412 are rotationally arranged at the inner ends of the two second side plates 4012 respectively, and the second rotating shaft 412 extends in the x-axis direction;

A third rotating shaft 402 and a fourth rotating shaft 403 which extend in the x-axis direction are also arranged between the top plate 401 and the bottom plate 408, and the third rotating shaft 402 and the fourth rotating shaft 403 are located on the same XOY plane; the third rotating shaft 402 and the fourth rotating shaft 403 are connected through an adjusting screw rod 410, the inner end of the adjusting screw rod 410 penetrates through the third rotating shaft 402 and the fourth rotating shaft 403 in the y-axis direction, and the adjusting screw rod 410 is engaged by thread with the third rotating shaft 402 and the fourth rotating shaft 403, and an adjusting head 4101 is arranged at the outer end of the adjusting screw rod 410;

The scissor fork lifting platform further comprises two scissor fork arms 409 which are connected up and down, wherein the scissor fork arm 409 comprises two connecting rods which are hinged in the middle, and the two ends of the two connecting rods respectively form a connecting end of the scissor fork arm 409; and the two ends of the first rotating shaft 404, the first sliding rod 413, the third rotating shaft 402 and the fourth rotating shaft 403 are respectively hinged to the connecting end of the scissor fork arm 409, wherein the two ends of the first rotating shaft 404 and the first sliding rod 413 and the third rotating shaft 402 and the fourth rotating shaft 403 are respectively hinged with the connecting end of the scissor fork arms 409, (the two ends of the first rotating shaft 404, the first sliding rod 413, the third rotating shaft 402 and the fourth rotating shaft 403 are respectively connected to the connecting end of the scissor fork arm 409, and the four connecting ends of the scissor fork arm 409 are respectively hinged to one end of the first rotating shaft 404, the first sliding rod 413, the third rotating shaft 402 and the fourth rotating shaft 403); and the two ends of the second rotating shaft 412, the second sliding rod 414, the third rotating shaft 402 and the fourth rotating shaft 403 are respectively hinged to the four connecting ends of the other scissor fork arm 409 (the two ends of the second rotating shaft 412, the second sliding rod, the third rotating shaft 402 and the fourth rotating shaft 403 are respectively connected to the four connecting ends of the other scissor fork arm 409, and the four connecting ends of the other scissor fork arm 409 are respectively hinged to one end of the second rotating shaft 412, the second sliding rod 414, the third rotating shaft 402 and the fourth rotating shaft 403);

A groove is formed in the lower surface of the clamp 407, a spring 411 capable of telescoping in the z-axis direction is arranged in the groove, and the upper end of the spring 411 is fixed in the groove, and the carbon brush set 406 comprises a plurality of carbon brushes, and the upper end of the carbon brushes extends into the groove and is connected with the lower end of the spring 411, the lower surface of the carbon brush is located below the output tube 102;

The magnetic field portion and the electric field portion are fixedly erected at the periphery of the laser head 1 through a supporting structure 3, wherein the supporting structure 3 comprises an L-shaped main supporting frame 301, and the main supporting frame 301 comprises a vertical plate 3011 and a horizontal plate 3012, and the lower end of the vertical plate 3011 is fixedly connected with the inner end of the horizontal plate 3012, the upper end of the vertical plate 3011 is fixed on the side surface of the lower fixing plate 202;

The supporting structure 3 further comprises a coil supporting frame 305 for fixing the electric field generation module 4, the coil supporting frame 305 comprises four supporting plates 309 for supporting the coil part, and a first through hole allowing one end of the U-shaped iron core 505 to penetrate through is formed in the middle of each supporting plate 309, and one end of the U-shaped iron core 505 penetrates through the first through hole and is connected with the iron core head 503, and the inner side of the supporting plate 309 is fixed on the horizontal plate 3012 through a connecting plate 310; and the shell 504 is fixedly connected with the supporting plate 309 and the connecting plate 310;

The top plate 401 of the electric field portion is fixed on the lower surface of the horizontal plate 3012 through bolts and nuts.

Figure 10:
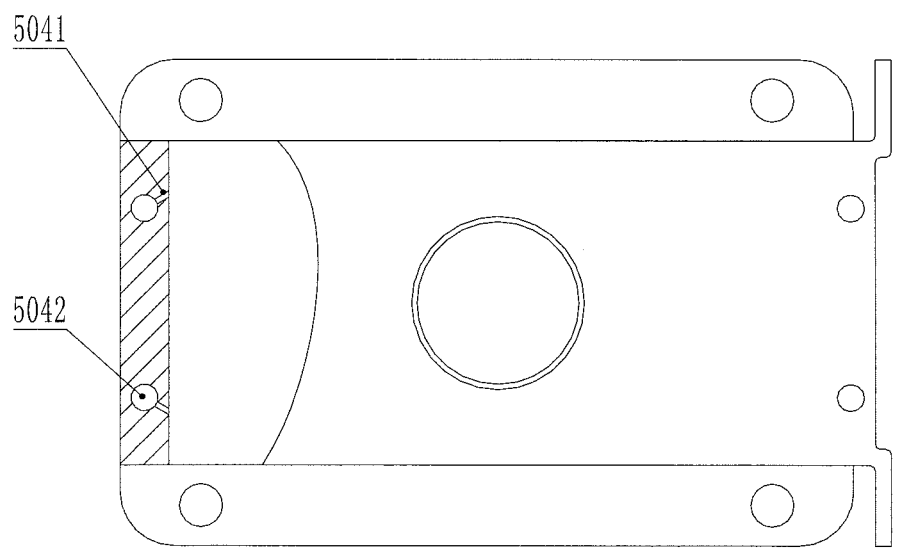
FIG. 10 is a sectional view of the inner structure of the shell.
Figure 11:
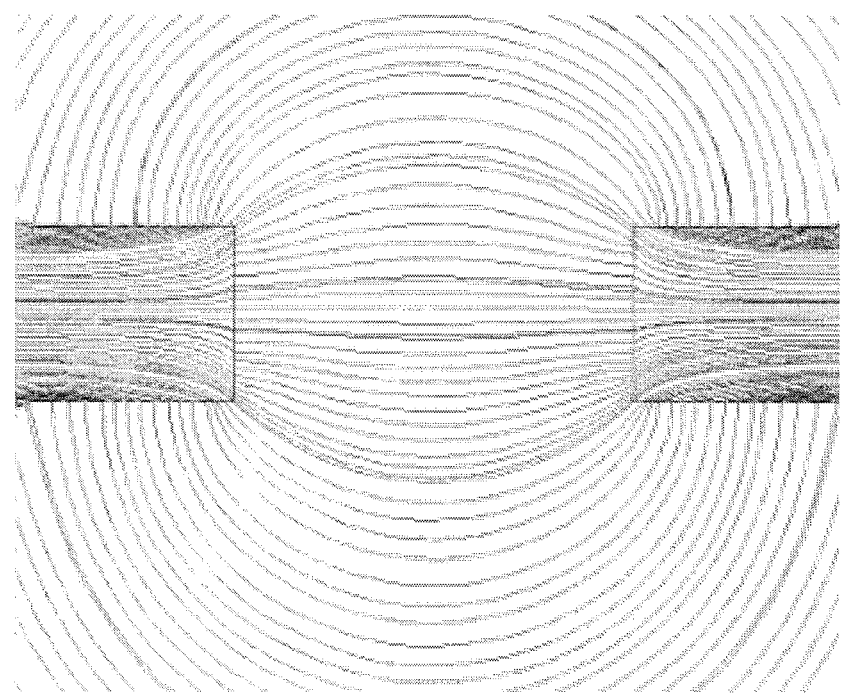
FIG. 11 is a schematic diagram of the distribution of the magnetic induction line under the use state when the iron core head is not provided with pointed part.
Figure 12:
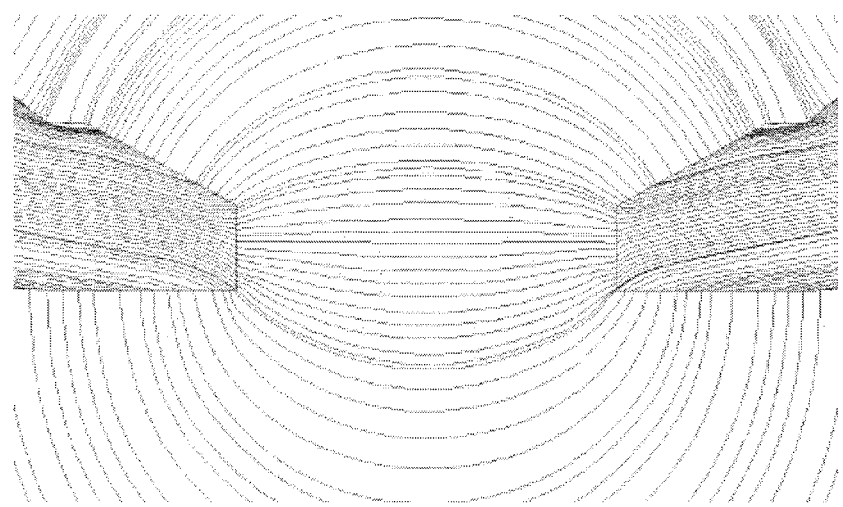
FIG. 12 is a schematic diagram of the distribution of a magnetic induction line under the use state when the iron core head is provided with pointed part in the present invention.

Further, the shell 504 is in a rectangular frame shape, and openings in the two sides of the rectangular frame form the heat dissipation window, and a second through hole 5043 and a third through hole 5044 for allowing one end of the U-shaped iron core 505 to penetrate through are formed in the top surface and the bottom surface of the rectangular frame; the cooling part comprises an inner air flow channel 5042 arranged on the side surface of the rectangular frame, the inner air flow channel 5042 extends from the top surface of the rectangular frame to the bottom surface of the rectangular frame in the central axis direction of the electromagnetic coil; an air inlet of the inner air flow channel 5042 is formed in the top surface of the rectangular frame, and the air inlet is communicated with the high-pressure air source; and a plurality of air outlets 5041 are arranged at intervals on one side, facing the electromagnetic coil 501, of the inner air flow channel 5042. Two rows of air outlets are formed in the side surface of each rectangular frame, and the air outlet is inclined towards the two sides of the side surface of the rectangular frame as shown in FIG. 10 to expand the cooling range.

Further, the magnetic field directions of the two electromagnetic coils 501 located on the same U-shaped iron core 505 are opposite, and the magnetic field intensity is the same, the magnetic field directions and the magnetic fields of the two electromagnetic coils 501 which are symmetric with respect to the x axis on the different U-shaped iron cores 505 are the same, and the specific implementation structure is as follows: each electromagnetic coil 501 is provided with an upper wiring end and a lower wiring end, and the upper wiring end of each electromagnetic coil 501 is connected with the positive electrode of the magnetic field power supply, and the lower wiring end of each electromagnetic coil 501 is connected with the negative electrode of the magnetic field power supply; and the winding directions of the two electromagnetic coils 501 located on the same U-shaped iron core 505 are opposite on the central column, the winding directions of the two electromagnetic coils 501 on the different U-shaped iron cores 505 which are symmetrical with respect to the x axis are the same on the central column;

Further, the device of the invention comprises a magnetic field junction box 304 which is fixed on the side supporting frame 302, the side supporting frame 302 is a trapezoidal plate, and the left side and the right side of the side supporting frame 302 are respectively fixed on the connecting plates 310 on the two sides, and the inner surface of the side supporting frame 302 is fixed on a vertical plate of the main supporting frame 301 through a side connecting plate 308; and the magnetic field junction box 304 is provided with two wiring ports 303 which are respectively connected with two electrodes of the magnetic field power supply, the electromagnetic coil 501 is respectively connected with two electrodes of the magnetic field power supply through the wiring ports 303, and the specific connecting structure is as follows:

The wiring port 303 comprises a first wiring port and a second wiring port, and the first wiring port is connected to the positive electrode of the power supply, the second wiring port is connected with the negative electrode of the power supply (or the first wiring port is connected with the positive electrode of the power supply, and the second wiring port is connected with the negative electrode of the power supply, which can be selected according to the specific magnetic field direction requirement).

The upper wiring ends of the two electromagnetic coils 501 located on the same U-shaped iron core 505 are respectively connected with the first wiring port, and the lower wiring ends of the two electromagnetic coils 501 located on the same U-shaped iron core 505 are connected with the second wiring port respectively. The connection modes of the two electromagnetic coils 501 on the different U-shaped iron cores 505 which are symmetric with respect to the x axis and the magnetic field junction box 304 are the same.

Further, the carbon brush set 406 comprises two carbon brushes which are both in a cuboid shape, and the two carbon brushes are symmetrically arranged in the y-axis direction, the lower surface of the carbon brush is a circular bead 4061, so that the lower surface of the carbon brush is smooth, and can be tightly attached to the outer surface of the part to be processed 7 (which is cylindrical).

Further, the U-shaped iron core 505 is in mortise and tenon connection with the iron core head 503, a mortise is formed in the connecting block 5032, a tenon which is matched with the mortise is arranged at the end of the U-shaped iron core.

Further, the connecting head 405 is a wiring copper plate pad, and the wiring copper plate pad is arranged at one end of the clamp 407, and the inner end of the wiring copper plate pad is connected with the carbon brush set 406, and the outer end of that is exposed to the outer end of the clamp 407 so as to be connected with an electric field power supply.

Further, the magnetic field power supply and the electric field power supply are both direct-current power sources.

Further, the pointed part 5033 is of a rectangular pyramid shape, and the big end of the rectangular pyramid of the pointed part 5033 is connected with the iron core head body 5031, the small head end of the rectangular pyramid of the pointed part 5033 points to the output tube 102; and the lower surface of the pointed part 5033 is flush with the lower surface of the iron core head body 5031.

The connecting plate 310 is connected with the horizontal plate 3012 through a connecting angle piece 306, a bolt and a nut, and one end of the connecting angle piece 306 is fixed on the inner surface of the connecting plate 310 through a bolt and a nut, and the other end of the connecting angle piece 306 is fixed on the horizontal plate 3012 through a bolt and a nut.

A rib plate 307 is arranged between the vertical plate 3011 and the horizontal plate 3012 of the L-shaped frame body, the rib plate 307 is in a right triangle shape, and the two right-angled sides of the rib plate 307 are fixedly connected with the vertical plate 3011 and the horizontal plate 3012 respectively. The connecting plate 310 is vertically connected with the supporting plate 309, and the connecting plate 310 and the supporting plate 309 are L-shaped, and the two supporting plates 309 are symmetrically and fixedly arranged in the x-axis direction to form a V-shape.

One side of the upper fixing plate 204 and that of the lower fixing plate 202 are connected through vertical plates 203, wherein the vertical plate 203 is connected with the mechanical arm 8 through a flange. The shell 504 is fixedly connected with the supporting plate 309 and the connecting plate 310 through bolts and nuts, wherein screw holes are correspondingly formed in the shell 504, the supporting plate 309 and the connecting plate 310.

The upper fixing plate 204 is detachably connected with the small fixing block 201, the small fixing block 201 and the upper fixing plate 204 define a clamping hole used for buckling the input tube 101;

The magnetic field generating module 5 is composed of an electromagnetic coil 501, an iron core 505 and the like, the magnetic field portion can generate a steady-state magnetic field with different magnetic field intensities by regulating the voltage of the external magnetic field power supply so as to adapt to different working conditions. The magnetic field is generated by four electromagnetic coils 501, and the magnetic field intensity is bundled and reinforced through the two U-shaped iron cores 505, the two U-shaped iron cores 505 are subjected to convergence treatment, so that the magnetic field intensity is enhanced. The structure of iron core head 503 is designed as follows: and the axis of the pointed part 5033 is displaced relative to the cylindrical section of the iron core head body 5031, and an upper side cutting angle is carried out on the original pointed part 5033 of the cube, and cutting inclined surface processing is carried out to form a rectangular pyramid-shaped pointed part 5033, so that the cross section of the pointed part 5033 is smaller and smaller towards the output tube 102, wherein the magnetic field intensity is enhanced, and the outer magnetic induction line of the pointed part 5033 is bent downwards, so that the magnetic fields generated by the four electromagnetic coils are further concentrated in the processing molten pool and the linearity of the magnetic field is improved;

The four electromagnetic coils 501 are arranged in an inclined circumference outside the output tube 102, and the structure is compact and stable, and is easily coupled with the laser head 1 so as to realize on-site repair of the part to be processed 7. Four rows of inner airflow channels 5042 externally connected with high-pressure air are arranged in the interior of the shell 504, air is discharged from the air outlet 5041 to the electromagnetic coil 501, so that the electromagnetic coil 501 can be blown in real time to reduce the temperature of the electromagnetic coil 501, and to improve the operation safety.

The connecting line between the two iron core heads and the movement direction of the laser head 1 are arranged in a 90-degree mode, so that the convex characteristics on the surface of the rotor shaft can be well utilized, the magnetic field intensity of the molten pool area is further enhanced, and the linearity of the magnetic field is improved, and the magnetic field moves in real time along with the laser head 1, so that the magnetic field always acts on the center of the molten pool. The shape of the end part of the iron core head 503 is designed, so that the magnetic field intensity of the molten pool area is further increased. If the south-north pole of the magnetic field needs to be replaced, only the wiring of the wiring port 303 needs to be replaced.

The electric field generating module 4 is composed of a scissor fork lifting platform, a carbon brush set 406 and the like, and is externally connected with a direct current electric field power supply, so that dynamic self-adaptive contact with the part to be processed 7 can be realized, the carbon brush set 406 and the part to be processed 7 are always kept in contact in the machining process. The scissor fork lifting platform adopts a quadrilateral structure, the distance between the third rotating shaft 402 and the fourth rotating shaft 403 can be increased or reduced by rotating the adjusting head 4101 of the adjusting screw rod 410, and therefore ascending and descending of the carbon brush set 406 can be realized, and the carbon brush set 406 can slide along the y-axis direction when the first sliding rod 413 and the second sliding rod 414 move in the y-axis direction, so that while the carbon brush set 406 is descended to the surface of the processed part, the distance between the two carbon brush sets is shortened automatically, and the current utilization rate is improved. While the carbon brush set 406 rises (the carbon brush set 406 moves in the z-axis direction), the distance between the carbon brush sets 406 on the left side and the right side is automatically increased (the carbon brush set 406 moves in the y-axis direction) to provide a good observation visual field for an operator of the device. The carbon brush set 406 is clamped by the clamp 407 in a detachable way, and the surface of the carbon brush set 406 is provided with a radian, so that the surface appearance of different parts can be adapted, and a special carbon brush set can also be designed. A spiral spring 411 is welded at the bottom of the groove of each clamp 407, so that in the machining process, the machining surface can be automatically matched, the carbon brush set 406 is always pressed on the surface of the part to be processed 7, the self-adaptive contact between the carbon brush set 406 and the part to be processed 7 is realized, and the stability of the electric field is improved.

The supporting structure 3 is composed of a coil supporting frame 305, a main supporting frame 301 and a side supporting frame 302, the main supporting frame 301 is connected with the fixing frame 2, and the fixing frame 2 is fixed to the mechanical arm 8 through a flange. The coil is fixed on the coil supporting frame 305, the coil supporting frame 305 forms a 90-degree angle and an inverted-V shape through two-step bending to match with the coil arrangement mode. The coil supporting frame 305 is fixedly connected to the main supporting frame 301 through bolts. In addition, the side supporting frame 302 is connected with the coil supporting frame 305 and the side connecting plate 308, and the side supporting frame 302 is designed to be in a trapezoid shape so as to be matched with the coil supporting frame 305.

The electromagnetic field synchronous coupling module 6 is installed on the mechanical arm 8 through a flange to realize on-site machining of the part to be processed 7. The carbon brush set 406 is installed in the groove of the carbon brush set clamp 407 in advance until the spiral spring 411 at the bottom is tightly pressed. The iron core of the device is divided into four parts, two iron cores 505 and two iron core heads 503, the two iron core heads 503 and the two iron cores 505 are installed in a matched mode before machining, so that the concentricity of the two iron core heads 503 and the iron cores 505 is guaranteed;

The embodiment uses a large-diameter rotor shaft as the part to be processed. Before laser processing is carried out on the rotor shaft, the special laser powder for processing is placed in a drying box at the temperature of 120° C. for drying for 2 hours, pre-processing treatment is carried out on the rotor shaft, namely, absolute ethyl alcohol is used for cleaning and blow-drying, and then the processing is carried out.

The device can be used for repairing on the working site, and the electromagnetic field synchronous coupling module is installed on the mechanical arm 8, the magnetic field power supply is externally connected with two wiring ports 303 on the magnetic field junction box 304 through two wires, and the two wires are connected with the two wiring ports 303 on the magnetic field junction box 304 respectively. When the direction of the magnetic field in the machining area needs to be changed, only the wiring direction on the two wiring ports 303 needs to be replaced. The two electrodes of the electric field power supply are respectively connected with the two wiring copper base plates 405, and the electric field power supply is provided with a switch.

The use process of the present invention is: as shown in the figures, firstly, the present invention is positioned in the pre-processing area of the part to be processed 7, and the output tube of the laser head is positioned right above the pre-processing area, and a gap is formed between the output tube and the pre-processing area; the connecting line of the two carbon brush sets 406 is parallel to the central axis of the rotor shaft (namely the part to be processed 7), and the adjusting screw rod 410 is rotated to start the scissor fork lifting platform to drive the carbon brush set 406 to move downwards, until the lower surface of the carbon brush set 406 is pressed on the rotor shaft tightly; and the two iron core heads 503 are respectively clamped on the two sides of the pre-processing area, and the connecting line of the two iron core heads 503 penetrates through the rotor shaft and are perpendicular to the central axis direction of the rotor shaft.

Then, the magnetic field power supply is turned on, the magnetic field intensity is adjusted to a preset size, and then the switch of the electric field power supply is turned on, the laser head is started and is processed according to a set program; electrification and magnetic flux are conducted until the processing is finished.

Embodiment 2

Refer to FIG. 1~FIG. 10.

The difference between this embodiment and the embodiment 1 is that the specific implementation structure is different by which the magnetic field directions of the two electromagnetic coils 501 located on the same U-shaped iron core 505 are opposite, and the magnetic field intensity of that are the same, and the magnetic field directions of the two electromagnetic coils 501 which are symmetric with respect to the x axis on the different U-shaped iron cores 505 are the same, and the magnetic field intensity of that are the same.

The specific implementation structure, by which the magnetic field directions of the two electromagnetic coils 501 located on the same U-shaped iron core 505 are opposite, and the magnetic field intensity of that are the same, and the magnetic field directions and the magnetic fields of the two electromagnetic coils 501 which are symmetric with respect to the x axis on the different U-shaped iron cores 505 are the same is as follows: each electromagnetic coil 501 is provided with an upper wiring end and a lower wiring end, and the upper wiring ends of the two electromagnetic coils 501 located on the same U-shaped iron core 505 are respectively connected with different electrodes (positive electrodes or negative electrodes) of the magnetic field power supply, and the lower wiring ends of the two electromagnetic coils 501 located on the same U-shaped iron core 505 are respectively connected with different electrodes (positive electrode or negative electrode) of the magnetic field power supply; and the upper wiring ends of the two electromagnetic coils 501 which are symmetric with respect to the x axis on the different U-shaped iron cores 505 are connected with the same electrode of the magnetic field power supply respectively, the lower wiring ends of the two electromagnetic coils 501 which are symmetric with respect to the x axis on the different U-shaped iron cores 505 are respectively connected with the same electrode of the magnetic field power supply.

The wiring port 303 comprises a first wiring port and a second wiring port, and the first wiring port is connected to the positive electrode of the power supply, the second wiring port is connected with the negative electrode of the power supply (or the first wiring port is connected with the negative electrode of the power supply, the second wiring port is connected with the positive electrode of the power supply, and the choice can be made according to the need of the specific magnetic field direction);

Connecting structure after adding magnetic field junction box 304 is as follows: the upper wiring ends of the two electromagnetic coils 501 located on the same U-shaped iron core 505 are connected with the first wiring port and the second wiring port respectively, and the lower wiring ends of the two electromagnetic coils 501 located on the same U-shaped iron core 505 are connected with the second wiring port and the first wiring port respectively; the connection mode of the upper wiring ends of the two electromagnetic coils 501 which are symmetric with respect to the x axis on the different U-shaped iron cores 505 and the magnetic field junction box 304 is the same.

The rest of the embodiment is the same as the embodiment 1.

The contents of the embodiments of this description are just a list of implementation forms of the inventive concept, the protection scope of the present invention should not be considered as being limited to the specific form set forth in the embodiments, the protection scope of the present invention also comprises equivalent technical means which can occur to those skilled in the art according to the conception of the present invention.

The invention claimed is:

1. A flexible self-adaptive composite carbon brush type electromagnetic composite field synchronous laser cladding device, comprises an electromagnetic field synchronous coupling module for machining a part to be processed, a mechanical arm for driving the electromagnetic field synchronous coupling module to move;

the electromagnetic field synchronous coupling module comprises a laser head, an electric field portion and a magnetic field portion;

the laser head is connected with the mechanical arm through a fixing frame, wherein the fixing frame comprises an upper fixing plate and a lower fixing plate which are opposite to each other in an up-and-down manner, and the upper fixing plate and the lower fixing plate are horizontally laid; an input tube of the laser head penetrates through the upper fixing plate upwards, and an output tube of the laser head vertically penetrates through the lower fixing plate, and a lower end outlet of the output tube is located above the part to be processed;

the magnetic field portion comprises two magnetic field generating modules which are arranged on a front side and a rear side of the output tube in a radial direction of the output tube respectively, each of the magnetic field generating modules comprises a U-shaped iron core with a downward opening, two ends of the U-shaped iron core correspond to a set of coil parts respectively; and each of the coil part2 comprises an electromagnetic coil, a coil framework made of a non-magnetic material and a shell made of a non-magnetic material, and the shell is arranged outside the coil framework and the electromagnetic coil; the coil framework comprises a hollow central column and two baffles arranged at two ends of the central column in a sleeved mode, the electromagnetic coil is wound on the central column and is positioned between the two baffles on the central column; the two ends of the central column are communicated, and one end of the U-shaped iron core penetrates through the central column;

the ends, located on the same side, of the two U-shaped iron cores is connected with one iron core head, and the ends, located on the other side, of the two U-shaped iron cores is connected with the other iron core head, and two iron core heads are symmetric with respect to an axial direction of the output tube;

the iron core head comprises an iron core head body which extends along the radial direction of the output tube, a central axis of the iron core head body is perpendicular to the central axis of the output tube; and a connecting block used for being detachably connected with the two U-shaped iron cores is arranged at an outer end of the iron core head body, and an inner end of the iron core head body is provided with a pointed part pointing to an extension line of the central axis of the output tube, and the iron core heads located on the two sides of the to-be-machined area of the part to be processed are located below the output tube;

an intersection point of the connecting line of the central axis of the two iron core heads and an extension line of the central axis of the output tube is defined as the origin of coordinates, and a straight line which passes through the origin of coordinates and coincides with the central axis of the output tube is a z axis, the connecting line of the central axis of the two iron core heads is an x axis, and an y-axis passes through the origin of coordinates and is perpendicular to both a z-axis and the x-axis direction; and the x-axis direction is defined as a front-and-back direction, the y-axis direction is a left-and-right direction, and the z-axis direction is a vertical direction, and an end close to the output tube and located in the middle is an inner end, an end far away from the output tube is an outer end, and two sets of magnetic field generating modules are symmetric with respect to the x axis, an included angle between the two U-shaped iron cores is θ, and 0<θ<180°;

each coil part has a same material and a same number of turns of the electromagnetic coil, and two ends of each electromagnetic coil are respectively provided with a connecting end used for being connected with a magnetic field power supply, the two ends of the electromagnetic coil are respectively connected with the magnetic field power supply, and the electromagnetic coils are connected in parallel; and magnetic field directions of the two electromagnetic coils located on the same U-shaped iron core are opposite, and a magnetic field intensity is the same; both the magnetic field directions and the magnetic field intensity of the two electromagnetic coils which are symmetric with respect to the x axis on the different U-shaped iron cores are the same;

a cooling part used for cooling the electromagnetic coils is arranged on the shell;

the electric field portion comprises two sets of electric field generating modules which are oppositely arranged on a left side and a right side of the output tube in the y-axis direction, and the two sets of electric field generating modules are symmetric with respect to the z axis; the electric field generating module comprises a carbon brush set and a scissor fork lifting platform capable of driving the carbon brush set to move in the y-axis direction and the z-axis direction; the scissor fork lifting platform is provided with a clamp used for fixing the carbon brush set, and the carbon brush set is connected with a connecting head used for being communicated with an electric field power supply;

the scissor fork lifting platform comprises a top plate and a bottom plate which are arranged at intervals up and down, and both the top plate and the bottom plate are perpendicular to the z axis; first side plates are oppositely arranged on a front side and a rear side of the upper surface of the bottom plate, and a first sliding groove which extends in the y-axis direction is formed in an inner end of the first side plate, and two ends of the first sliding rod are arranged in the first sliding grooves in two sides in a sliding mode, and the first sliding rod extends in the x-axis direction; two ends of the first rotating shaft are rotatably arranged on outer ends of two first side plates respectively, and the first rotating shaft extends in the x-axis direction; second side plates are oppositely arranged on a front side and a rear side of the a lower surface of the top plate, and a second sliding groove which extends in the y-axis direction is formed in the outer end of the second side plate, and two ends of the second sliding rod are arranged in the second sliding grooves in the two sides in a sliding mode; and the ends of the second rotating shaft are rotationally arranged at an inner ends of the two second side plates respectively, and the second rotating shaft extends in the x-axis direction;

a third rotating shaft and a fourth rotating shaft which extend in the x-axis direction are also arranged between the top plate and the bottom plate, and the third rotating shaft and the fourth rotating shaft are located on a same xoy plane; the third rotating shaft and the fourth rotating shaft are connected through an adjusting screw rod, and an inner end of the adjusting screw rod penetrates through the third rotating shaft and the fourth rotating shaft in the y-axis direction, and the adjusting screw rod is in threaded connection with the third rotating shaft and the fourth rotating shaft, and an adjusting head is arranged at an outer end of the adjusting screw rod;

wherein the scissor fork lifting platform further comprises two scissor fork arms which are connected up and down, wherein the scissor fork arm comprises two connecting rods which are hinged in a middle, and the two ends of the two connecting rods respectively form a connecting end of the scissor fork arm; the two ends of the first rotating shaft, the first sliding rod, the third rotating shaft and the fourth rotating shaft are respectively hinged with the connecting end of the scissor fork arm; the two ends of the second rotating shaft, the second sliding rod, the third rotating shaft and the fourth rotating shaft are respectively hinged with the connecting end of the other scissor fork arm;

a groove is formed in a lower surface of the clamp, and a spring which can stretch out of in the z-axis direction is arranged in the groove, an upper end of the spring is fixed in the groove, and the carbon brush set comprises a plurality of carbon brushes, and an upper end of the carbon brushes extends into the groove and is connected with a lower end of the spring, and a lower surface of the carbon brush is located below the output tube;

the magnetic field portion and the electric field portion are fixedly erected at a periphery of the laser head through the supporting structure; a supporting structure comprises a L-shaped main supporting frame, and a main supporting frame comprises a vertical plate and a horizontal plate, and a lower end of the vertical plate is fixedly connected with an inner end of the horizontal plate, and an upper end of the vertical plate is fixed on a side surface of the lower fixing plate;

the supporting structure further comprises a coil supporting frame used for fixing the coil part, a coil supporting frame comprises four supporting plates for supporting the coil part, and a first through hole allowing one end of the U-shaped iron core to penetrate through is formed in a middle of each supporting plate, and one end of the U-shaped iron core penetrates through the first through hole and is connected with the iron core head, and an inner side of the supporting plate is fixed on the horizontal plate through a connecting plate; the shell is fixedly connected with the supporting plate and the connecting plate;

the top plate of the electric field portion is fixed on the lower surface of the horizontal plate through bolts and nuts.

2. The flexible self-adaptive composite carbon brush type electromagnetic composite field synchronous laser cladding device according to claim 1, wherein the shell is in a rectangular frame shape, and a second through hole and a third through hole for allowing one end of the U-shaped iron core to penetrate through are formed in a top surface and a bottom surface of a rectangular frame, the cooling part comprises an inner air flow channel arranged on a side surface of the rectangular frame, and the inner air flow channel extends from the top surface of the rectangular frame to the bottom surface in a central axis direction of the electromagnetic coil; an air inlet of the inner air flow channel is formed in the top surface of the rectangular frame, and the air inlet is communicated with a high-pressure air source; a plurality of air outlets which are arranged in a row are formed in one side, facing the electromagnetic coil, of the inner air flow channel.

3. The flexible self-adaptive composite carbon brush type electromagnetic composite field synchronous laser cladding device as claimed in claim 2, wherein the magnetic field directions of the two electromagnetic coils located on the same U-shaped iron core are opposite, and the magnetic field intensity of that is the same, the magnetic field directions and the magnetic field intensity of the two electromagnetic coils which are symmetric with respect to the x axis on the different U-shaped iron cores are the same, and the specific implementation structure is as follows: each electromagnetic coil is provided with an upper wiring end and a lower wiring end, and the upper wiring end of each electromagnetic coil is connected with the positive electrode of the magnetic field power supply, and the lower wiring end of each electromagnetic coil is connected with a negative electrode of the magnetic field power supply; and winding directions of the two electromagnetic coils located on the same U-shaped iron core are opposite on the central column, the winding directions of the two electromagnetic coils on the different U-shaped iron cores which are symmetric with respect to the x axis are the same on the central column.

4. The flexible self-adaptive composite carbon brush type electromagnetic composite field synchronous laser cladding device as claimed in claim 3, wherein further comprises a magnetic field junction box, the magnetic field junction box is fixed on a side supporting frame, and the side supporting frame is a trapezoidal plate, and a left side and a right side of the side supporting frame are respectively fixed on the connecting plates on the two sides, and an inner surface of the side supporting frame is fixed on a vertical plate of the main supporting frame through a side connecting plate; and two wiring ports which are respectively connected with two electrodes of the magnetic field power supply are arranged on the magnetic field junction box, wherein the electromagnetic coil is respectively connected with two electrodes of the magnetic field power supply through the wiring ports.

5. The flexible self-adaptive composite carbon brush type electromagnetic composite field synchronous laser cladding device as claimed in claim 4, wherein the carbon brush set comprises two carbon brushes which are both cuboid-shaped, and the two carbon brushes are symmetrically arranged in the y-axis direction; the lower surface of the carbon brush is a circular bead.

6. The flexible self-adaptive composite carbon brush type electromagnetic composite field synchronous laser cladding device as claimed in claim 5, wherein the U-shaped iron core is connected with the iron core head in a mortise and tenon manner, a mortise is formed in the connecting block, a tenon which is matched with the mortise is arranged at the end of the U-shaped iron core.

7. The flexible self-adaptive composite carbon brush type electromagnetic composite field synchronous laser cladding device as claimed in claim 6, wherein the connecting head is a wiring copper plate pad, the wiring copper plate pad is arranged at one end of the clamp, an inner end of the wiring copper plate pad is connected with the carbon brush set, and an outer end is exposed to an outer end of the clamp.

8. The flexible self-adaptive composite carbon brush type electromagnetic composite field synchronous laser cladding device as claimed in claim 7, wherein the magnetic field power supply and the electric field power supply are both direct-current power sources.

9. Flexible self-adaptive composite carbon brush type electromagnetic composite field synchronous laser cladding device as claimed in claim 8, wherein the pointed part is in a rectangular pyramid shape, a big end of the rectangular pyramid is connected with the iron core head body, and a small head end of the rectangular pyramid points to the output tube; and a lower surface of the pointed part is flush with a lower surface of the iron core head body.

10. The flexible self-adaptive composite carbon brush type electromagnetic composite field synchronous laser cladding device as claimed in claim 2, wherein the magnetic field directions of the two electromagnetic coils located on the same U-shaped iron core are opposite, the magnetic field intensity of that is the same, and the magnetic field directions and the magnetic field intensity of the two electromagnetic coils which are symmetric with respect to the x axis on the different U-shaped iron cores are the same, and the specific implementation structure is as follows: each electromagnetic coil is provided with an upper wiring end and a lower wiring end, and the upper wiring ends of the two electromagnetic coils located on the same U-shaped iron core are connected with different electrodes of the magnetic field power supply respectively, and the lower wiring ends of the two electromagnetic coils located on the same U-shaped iron core are connected with different electrodes of the magnetic field power supply respectively; the upper wiring ends of the two electromagnetic coils which are symmetric with respect to the x axis on different U-shaped iron cores are respectively connected with the same electrode of the magnetic field power supply, the lower wiring ends of the two electromagnetic coils which are symmetric with respect to the x axis on different U-shaped iron cores are respectively connected with the same electrode of the magnetic field power supply.

11. The flexible self-adaptive composite carbon brush type electromagnetic composite field synchronous laser cladding device as claimed in claim 10, wherein further comprises a magnetic field junction box, the magnetic field junction box is fixed on a side supporting frame, and the side supporting frame is a trapezoidal plate, and a left side and a right side of the side supporting frame are respectively fixed on the connecting plates on the two sides, and an inner surface of the side supporting frame is fixed on a vertical plate of the main supporting frame through a side connecting plate; and two wiring ports which are respectively connected with two electrodes of the magnetic field power supply are arranged on the magnetic field junction box, wherein the electromagnetic coil is respectively connected with two electrodes of the magnetic field power supply through the wiring ports.

\* \* \* \* \*